United States Patent
Ma et al.

(10) Patent No.: US 10,989,881 B2
(45) Date of Patent: Apr. 27, 2021

(54) OPTICAL CONNECTORS FOR LIGHT-TURNING FERRULES

(71) Applicant: 3M INNOVATIVE PROPERTIES COMPANY, St. Paul, MN (US)

(72) Inventors: Changbao Ma, Austin, TX (US); Boon K. Lee, Leander, TX (US); Bing Hao, Woodbury, MN (US); Stephen Paul LeBlanc, Austin, TX (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 16/796,420

(22) Filed: Feb. 20, 2020

(65) Prior Publication Data

US 2020/0278501 A1     Sep. 3, 2020

Related U.S. Application Data (60) Provisional application No. 62/812,463, filed on Mar. 1, 2019.

(51) Int. Cl.
*G02B 6/38*     (2006.01)

(52) U.S. Cl.
CPC ......... *G02B 6/3881* (2013.01); *G02B 6/3825* (2013.01)

(58) Field of Classification Search
CPC ... G02B 6/3881; G02B 6/3839; G02B 6/3879
See application file for complete search history.

(56) References Cited

U.S. PATENT DOCUMENTS

| | | | | |
|---|---|---|---|---|
| 8,591,123 | B2* | 11/2013 | Wang | G02B 6/3817 385/76 |
| 9,335,488 | B2* | 5/2016 | Chan | G02B 6/3825 |
| 10,606,003 | B2* | 3/2020 | Peterson | G02B 6/4292 |
| 2015/0219863 | A1* | 8/2015 | Haase | G02B 6/3885 385/60 |
| 2015/0301286 | A1* | 10/2015 | Chan | G02B 6/3825 385/56 |
| 2018/0364425 | A1* | 12/2018 | Nanjo | G02B 6/3822 |
| 2020/0124804 | A1* | 4/2020 | Chen | G02B 6/3839 |

OTHER PUBLICATIONS

"PRIZM® LightTurn® connector", USCONEC [retrieved from the Internet on Apr. 7, 2020], URL <https://www.usconec.com/connectors/prizm-lightturn>, 2020, pp. 1-9.

* cited by examiner

*Primary Examiner* — Sung H Pak
(74) *Attorney, Agent, or Firm* — Jonathan L. Tolstedt (57) ABSTRACT

An optical connector includes a housing with a bottom wall defining a window therein, and an optical ferrule disposed in the housing and comprising opposing major top and bottom surfaces. The major bottom surface of the optical ferrule faces the bottom wall of the housing. The major top surface includes a groove and a light redirecting surface configured to receive light along a first direction from an optical fiber received and secured in the groove, and redirect the received light along a different second direction. The redirected light exits the optical ferrule though the bottom surface and exits the housing through the window, such that, when the optical connector mates with a mating optical connector including a mating optical ferrule, the mating optical ferrule prevents any of the light exiting the optical ferrule from exiting the housing of the optical connector.

14 Claims, 9 Drawing Sheets

OPTICAL CONNECTORS FOR LIGHT-TURNING FERRULES

SUMMARY

In some aspects of the present description, an optical connector is provided, including a housing with a bottom wall defining a window therein, and an optical ferrule disposed in the housing and including opposing major top and bottom surfaces. The major bottom surface of the optical ferrule faces the bottom wall of the housing. The major top surface includes a groove and a light redirecting surface configured to receive light along a first direction from an optical fiber received and secured in the groove, and redirect the received light along a different second direction. The redirected light exits the optical ferrule though the bottom surface and exits the housing through the window, such that, when the optical connector mates with a mating optical connector including a mating optical ferrule, the mating optical ferrule prevents the light exiting the optical ferrule from exiting the housing of the optical connector.

In some aspects of the present description, an optical connector is provided, the optical connector including a housing and a plurality of generally stacked optical ferrules. The housing includes a mating end for mating with a mating optical connector, an opposite optical fiber end for receiving an optical cable therethrough, and a bottom wall extending between the mating and fiber ends and defining a cutout window therethrough at the mating end.

The plurality of generally stacked optical ferrules is disposed in the housing. Each optical ferrule includes opposing major top and bottom surfaces. The major bottom surface faces the bottom wall of the housing. The major top surface includes a groove and a light redirecting surface. The light redirecting surface is configured to receive light along a first direction from an optical fiber received and secured in the groove, and to redirect the received light along a different second direction. The redirected light exits the optical ferrule though the bottom surface and exits the housing through the cutout window, such that when the optical connector mates with a mating optical connector including a plurality of mating optical ferrules, each mating optical ferrule prevents the light exiting the corresponding optical ferrule from exiting the housing of the optical connector through the cutout window.

DETAILED DESCRIPTION

In the following description, reference is made to the accompanying drawings that form a part hereof and in which various embodiments are shown by way of illustration. The drawings are not necessarily to scale. It is to be understood that other embodiments are contemplated and may be made without departing from the scope or spirit of the present description. The following detailed description, therefore, is not to be taken in a limiting sense.

There is an increasing need for new types and designs of fiber optic connectors in the communications industry. One emerging design for connectors features expanded beam, light-turning fiber optic connectors, which provide advantages over physical contact connectors, including advantages in dust proofing and repeatability. An optical connector (or an optical ferrule within the connector) can "turn" or redirect light from a first, incoming direction to a second, outgoing direction. These light-turning optical connectors often include one or more optical ferrules encased in a housing. The optical ferrules are typically components which accept the stripped end of one or more optical fibers and help align the fiber and direct light from the fiber to a mating component, such as a photonic integrated circuit (PIC). However, the housing of the optical connector typically prevents direct access to the light output from the optical ferrule, which in turn prevents testing, inspection, or cleaning of the optical ferrule without removing the ferrule from the housing. In addition, when multiple optical ferrules are provided within a single housing (e.g., in a vertically stacked configuration), the light output from one ferrule may be blocked by the next ferrule in the stack, preventing detection by a text fixture at the connector level (i.e., individual ferrules must be removed from the housing for testing.)

According to some aspects of the present description, novel optical connector designs featuring openings or "windows" for output from or access to light-turning ferrules are described. In some embodiments, an optical connector includes a housing with a bottom wall defining a window therein, and an optical ferrule disposed in the housing and including opposing major top and bottom surfaces, such that the major bottom surface of the optical ferrule faces the bottom wall of the housing. The major top surface includes a groove and a light redirecting surface configured to receive light along a first direction from an optical fiber received and secured in the groove, and redirect the received light along a different second direction. The redirected light exits the optical ferrule though the bottom surface and exits the housing through the window, such that, when the optical connector mates with a mating optical connector including a mating optical ferrule, the mating optical ferrule prevents any of the light exiting the optical ferrule from exiting the housing of the optical connector. That is, when in a mated position, redirected light exiting the bottom surface of the first optical ferrule and enters the adjacent bottom surface of the mating optical ferrule, where it may be redirected into a second optical fiber attached to the mating optical ferrule. In some embodiments, the mating optical ferrule may be substantially similar to the first optical ferrule. In some embodiments, the mating optical ferrule may be an alternate embodiment.

In some embodiments, the bottom wall of the housing may be substantially opaque in a first wavelength range, and the window may be substantially transparent in the first wavelength range. In some embodiments, the first wavelength range may be from about 800 nm to about 950 nm. In some embodiments, the first wavelength range may be from about 1250 nm to about 1350 nm. In some embodiments, the first wavelength range may be from about 1250 nm to about 1700 nm. In some embodiments, the average optical transmission of the bottom wall in the first wavelength range may be less than about 1%, and the average optical transmission of the window in the first wavelength range may be greater than about 70%. In some embodiments, the bottom wall of the housing, or the entire connector housing, may be substantially transparent in the first wavelength range. In some embodiments, the bottom wall of the housing may be substantially transparent in the first wavelength range, and a portion of the bottom wall itself may be the window (i.e., a transparent bottom wall or transparent connector housing would allow light to pass, and a separate window may not be required.)

In some embodiments, the connector housing may include a sliding cover which covers the window in a first position and uncovers the window in a second position. In some embodiments, the window may be a through opening, and the sliding cover may both cover and/or seal the through opening. In some embodiments, the window may be of a transparent material (e.g., an optical grade transparent sheet), and the sliding cover may cover and/or seal the transparent material.

In some embodiments, the window may be a through opening defined by the bottom wall. In some embodiments, the window may be positioned all the way to a first, front edge of the bottom wall, such that the window defines an open notch shape or cutout in the bottom wall (i.e., at least one side or portion of the window is open and not framed by the bottom wall). The window (or notch) may be any shape, including but not limited to rectangular, triangular, circle, oval, or any other appropriate shape. The window may be any appropriate size, and, in some embodiments, may extend beyond the edges of the bottom wall (e.g., could wrap around to one or more side walls.) It should be noted that, in some embodiments, the connector housing may be any appropriate shape, including but not limited to a rectangular prism, a triangular prism, or a cylinder. In the case of a cylinder, the "bottom wall" may be defined as a portion of the cylinder's outer surface adjacent the bottom surface of the optical ferrule.

In some embodiments, the housing further includes a top wall opposite the bottom wall, such that the top wall faces the major top surface of the optical ferrule. In some embodiments, the top wall does not include a window therein.

According to some aspects of the present description, an optical connector assembly is provided, including an optical connector as described elsewhere herein, and an optical fiber received and secured in the groove, such that the light redirecting surface is configured to receive light from the optical fiber along the first direction and redirect the received light along the second direction, the redirected light exiting the optical ferrule though the bottom surface and exiting the housing through the window.

According to some aspects of the present description, an optical connector is provided, the optical connector including a housing and a plurality of generally stacked optical ferrules. The housing includes a mating end for mating with a mating optical connector, an opposite optical fiber end for receiving an optical cable therethrough, and a bottom wall extending between the mating and fiber ends and defining a cutout window therethrough at the mating end.

In some embodiments, he plurality of generally stacked optical ferrules is disposed in the housing. Each optical ferrule includes opposing major top and bottom surfaces. In some embodiments, the major bottom surface of each optical ferrule faces the bottom wall of the housing. The major top surface of each optical ferrule includes a groove and a light redirecting surface. The light redirecting surface of each optical ferrule is configured to receive light along a first direction from an optical fiber received and secured in the groove, and to redirect the received light along a different second direction. The redirected light exits each optical ferrule though the bottom surface and exits the housing through the cutout window, such that when the optical connector mates with a mating optical connector including a plurality of mating optical ferrules, each mating optical ferrule prevents any of the light (or at least a portion thereof) exiting the corresponding optical ferrule from exiting the housing of the optical connector through the cutout window.

In some embodiments, the plurality of generally stacked optical ferrules are substantially aligned vertically. In some embodiments, the plurality of generally stacked optical ferrules are stacked in an offset, staggered configuration, such that the light redirecting surface of each optical ferrule is configured to receive light along a first direction from an optical fiber received and secured in the groove and redirect the received light along a different second direction, the redirected light exiting the optical ferrule at an exit location of the bottom surface of the optical ferrule, wherein for each pair of adjacent optical ferrules, the exit locations of the optical ferrules are offset relative to each other along the first and second directions.

Figure 1:
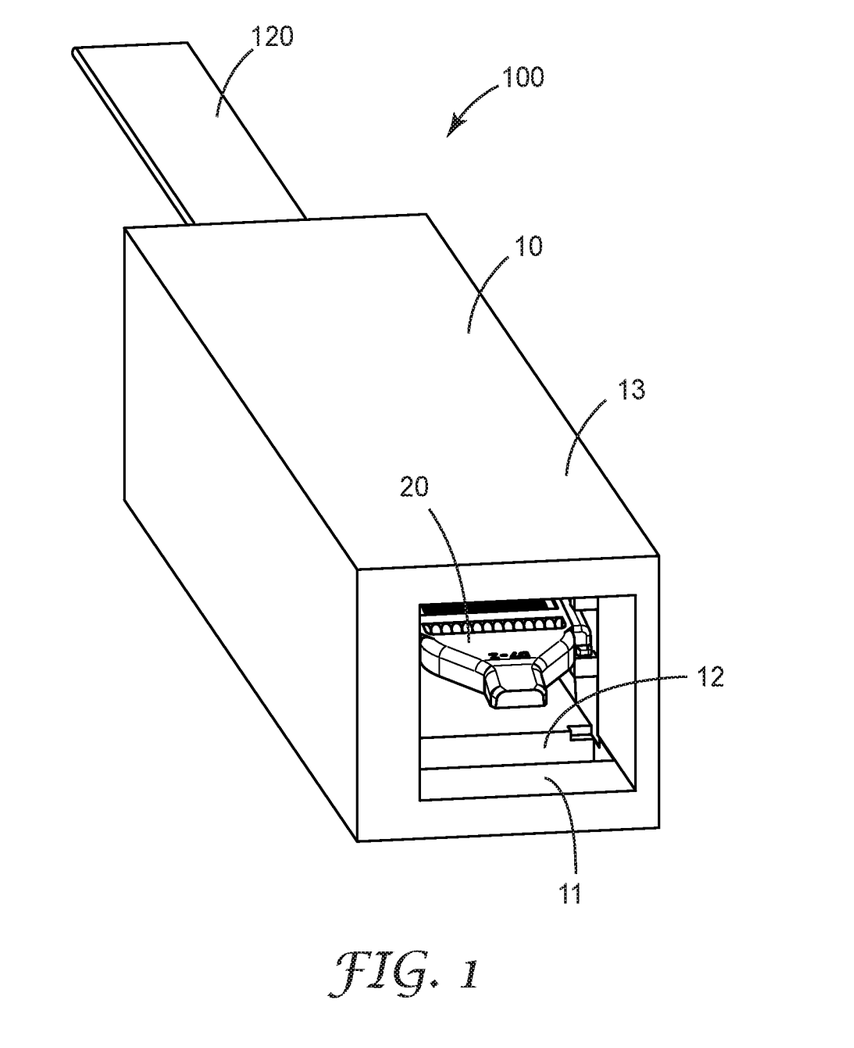
FIG. 1 is a perspective view of an optical connector, in accordance with an embodiment of the present description.

Turning now to the figures, FIG. 1 is a perspective view of an optical connector, in accordance with an embodiment described herein. In some embodiments, the optical connector 100 includes an optical ferrule 20 disposed in a connector housing 10. In some embodiments, connector housing 10 includes a bottom wall 11 and an opposing top wall 13. It should be noted that, in some embodiments, the connector housing 10 may be a shape other than the rectangular prism shown in FIG. 1 (e.g., may be cylindrical), and therefore may not define clearly distinguishable top and bottom walls. In such an embodiment, the terms bottom wall 11 and top wall 13 should be understood to refer to a bottom portion or surface and a top portion or surface of the housing 10, respectively.

In some embodiments, the bottom wall 11 may include a window 12. In some embodiments, window 12 may be a through opening. In some embodiments, window 12 may be at least partially covered by a material which is substantially transparent to at least one wavelength range of light (e.g., a range of about 1250 nm to about 1650 nm).

In some embodiments, an optical cable 120 may enter into a receiving end of connector housing 10. The optical cable 120 may include one or more optical fibers which attach to optical ferrule as described in FIG. 2 (see element 40 of FIG. 2).

Figure 2:
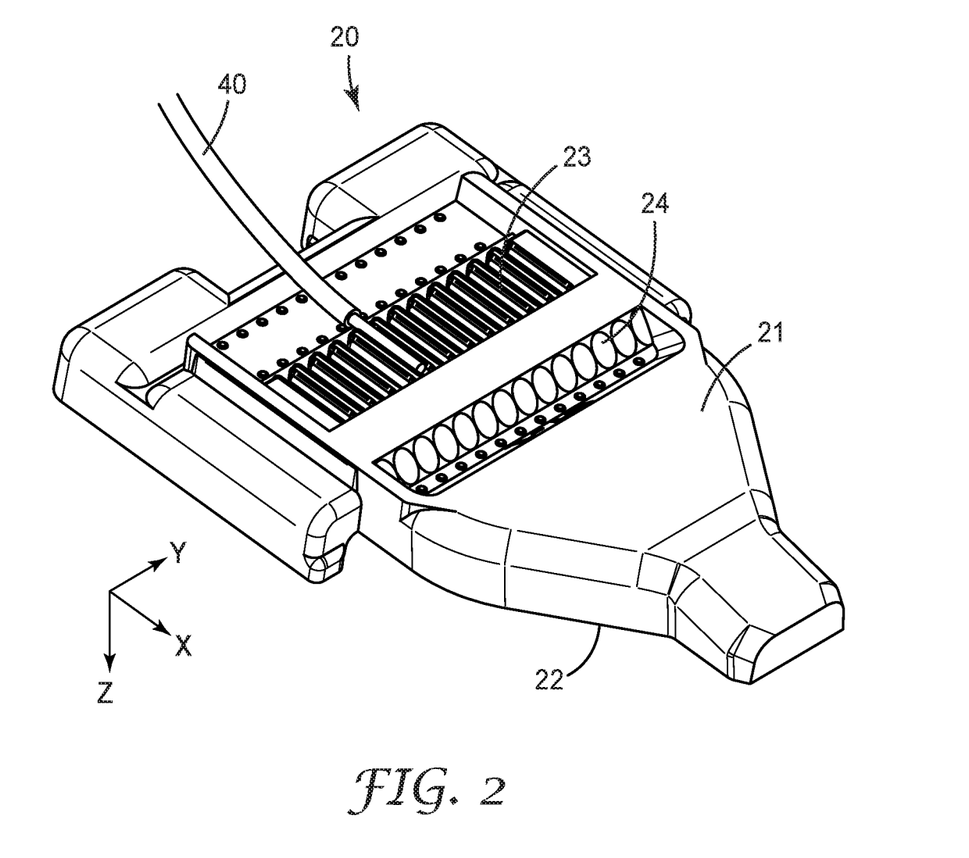
FIG. 2 is a perspective view of an optical ferrule, in accordance with an embodiment of the present description.

FIG. 2 is a perspective view of an optical ferrule, in accordance with an embodiment described herein. Optical ferrule 20 may be included in an optical connector, such as the optical connector of FIG. 1. In some embodiments, optical ferrule 20 may have opposing major top 21 and bottom 22 surfaces. In some embodiments, the optical ferrule 20 may be disposed in an optical connector (such as connector 100 of FIG. 1) such that the major bottom surface 22 faces the bottom wall 11 of connector 100. In some embodiments, the major top surface 21 may include at least one groove 23 for receiving and securing an optical fiber 40. Major top surface 21 may also include a light redirecting surface 24 which receives light from optical fiber 40 along a first direction X and redirects the light along a different second direction Z.

Figure 3A:
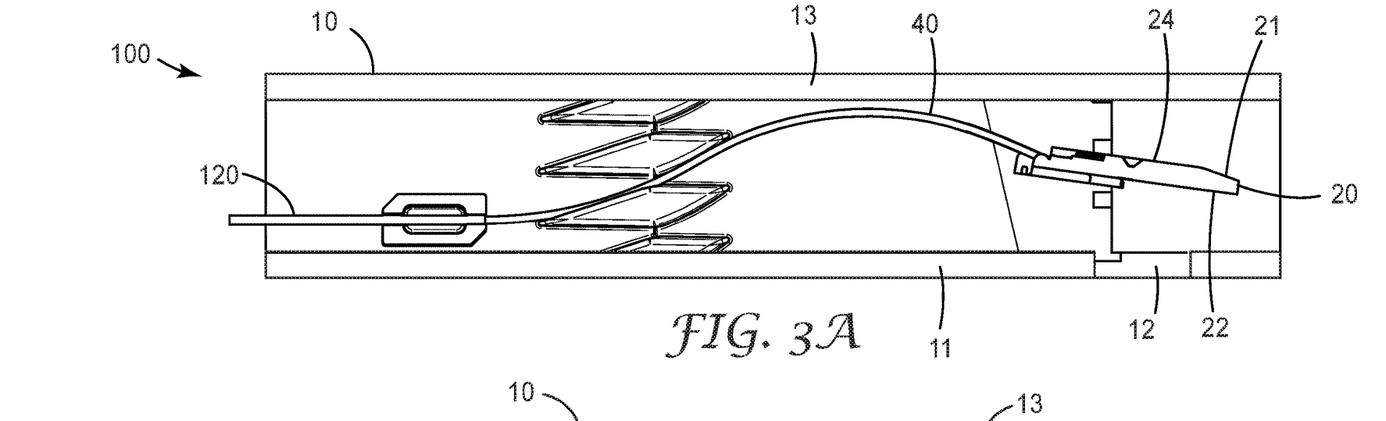
FIGS. 3A and 3B are cross-sectional views of an optical connector, in accordance with an embodiment of the present description.
Figure 3B:
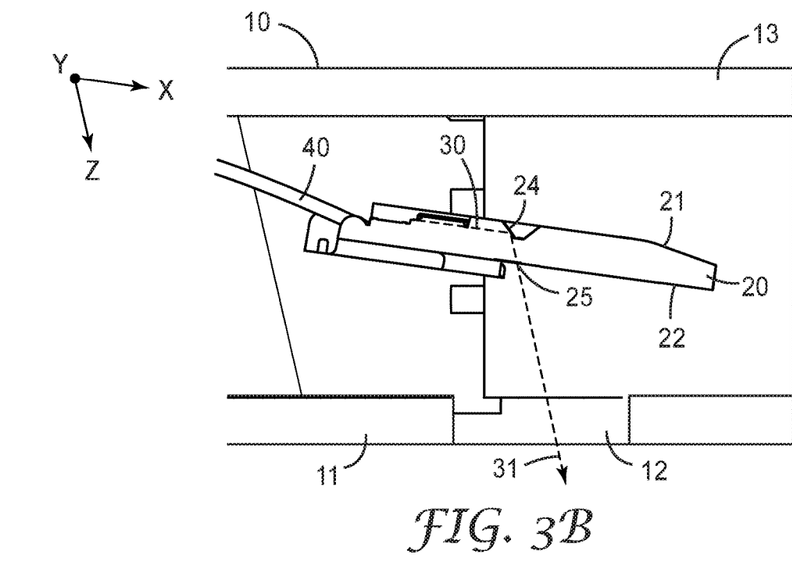

FIGS. 3A and 3B provide cross-sectional views of an optical connector, such as the optical connector of FIG. 1. FIGS. 3A and 3B contain slightly different views of substantially the same components, and the figures should be examined together for the following discussion. Elements in one figure provide the same function as their like-numbered counterpart in the other figure, as well as in FIGS. 1-2.

An optical cable 120 enters on a receiving end of connector housing 10 and connects to optical ferrule 20 via at least one optical fiber 40. Optical ferrule 20 is disposed such that major top surface 21 faces top wall 13 of housing 10, and major bottom surface 22 faces bottom wall 11 and window 12. Received light 30 exits optical fiber 40 and is reflected from light redirecting surface 24 along a first direction X to become redirected light 31. Redirected light 31 exits optical ferrule 20 through bottom surface 22 at exit location 25, and exits connector 100 through window 12. When a mating connector containing a mating optical ferrule (discussed in FIG. 4) is mated with optical connector 100, substantially all of the redirected light 31 passes into the mating optical ferrule and no longer is allowed to exit the housing 10 via window 12.

Figure 4:
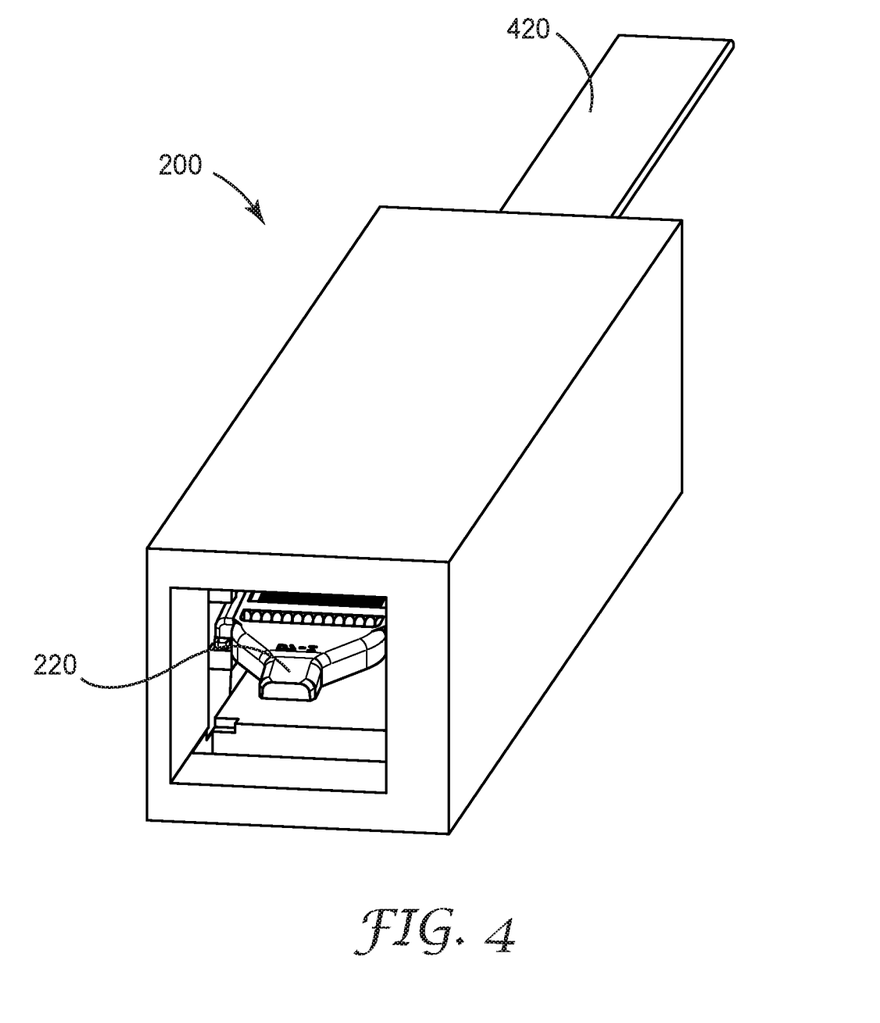
FIG. 4 is a perspective view of a mating optical connector, in accordance with an embodiment of the present description.
Figure 5:
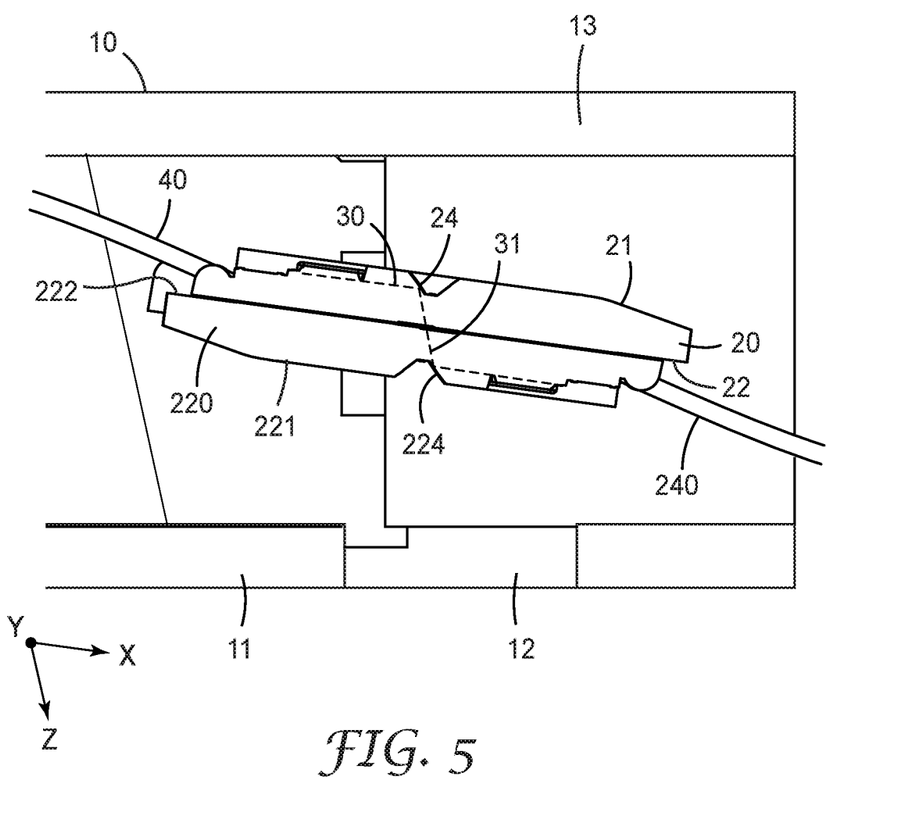
FIG. 5 is a cross-sectional view of an optical assembly, in accordance with an embodiment of the present description.

FIG. 4 is a perspective view of a mating optical connector 200 with a mating optical ferrule 220, and FIG. 5 shows a cross-sectional view of an optical assembly, showing how the mating optical ferrule 220 is disposed in relation to (first) optical ferrule 20 when optical connector 100 is properly mated with mating optical connector 200. IT should be noted that, for clarity, only the mating optical ferrule of optical connector 200 is shown in FIG. 5.

Looking at FIGS. 4 and 5 in conjunction, optical cable 420 enters into a receiving end of mating optical connector 200 and connects to mating optical ferrule 220 via at least one optical fiber 240. The bottom major surface 222 of mating optical ferrule 220 faces up toward and is adjacent to the bottom major surface 22 of first optical ferrule 20, and the major top surface 221 of mating optical ferrule 220 faces bottom wall 11 and window 12 of connector housing 10. Received light 30 is reflected off of (first) light reflecting surface 24 of optical ferrule 20 and strikes (second) light reflecting surface 224 of mating optical ferrule 220, where it is redirected into the receiving optical fiber 240. It should be noted that, in the fully mated position, the mating optical ferrule 220 prevents any of the redirected light 31 from exiting the housing 10 of optical connector 100.

In some embodiments, the mating optical connector 200 may have an output window similar to window 12 in connector 100 of FIG. 1. In some embodiments, the mating optical connector 200 may not have an output window. In some embodiments, the mating optical connector 200 may be designed such that, when mated with the first optical connector, the housing of the mating optical connector 200 covers window 12 of the first optical connector.

Figure 6:
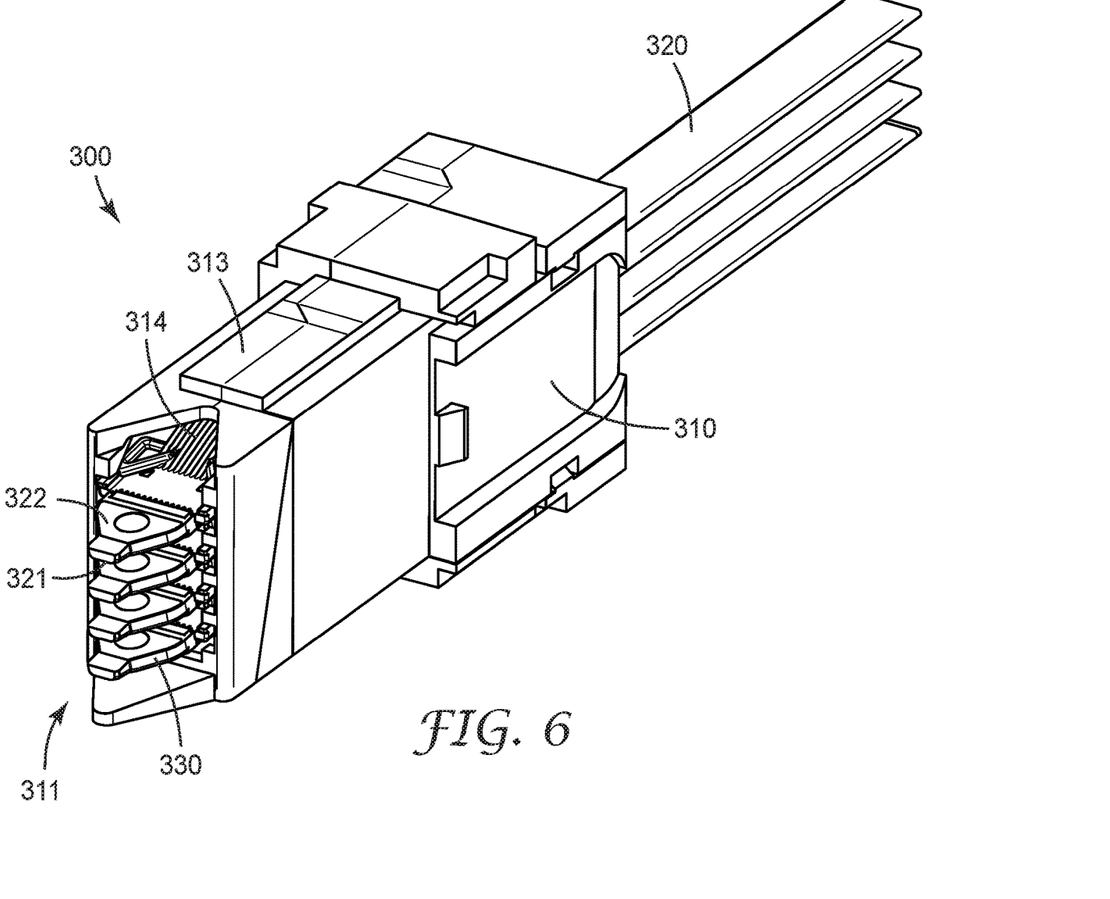
FIG. 6 is a perspective view of an optical connector with multiple optical ferrules, in accordance with an embodiment of the present description.
Figure 7:
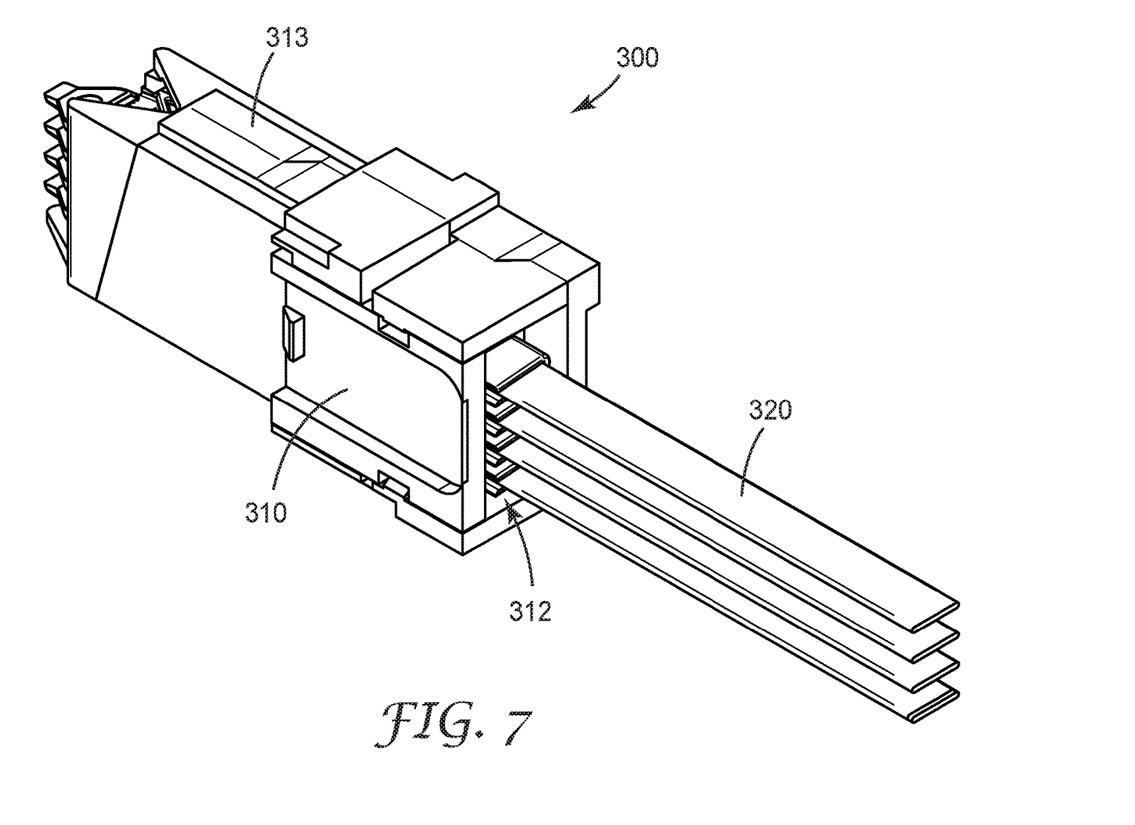
FIG. 7 is an alternate perspective view of an optical connector with multiple optical ferrules, in accordance with an embodiment of the present description.

FIGS. 6 and 7 provide alternate perspective views of an optical connector 300 with multiple optical ferrules, in accordance with an embodiment described herein. Elements in FIG. 6 provide the same function as their like-numbered counterpart in the FIG. 7, and vice versa, and the two figures should be examined together for the following discussion.

A connector housing 310 includes a mating end 311 and an opposite optical fiber end 312. One or more optical cables 320 each containing one or more optical fibers (not shown, but consistent with optical fiber 40 in FIG. 2) is received by connector housing 310 through optical fiber end 312. A plurality of generally vertically stacked optical ferrules 330 are disposed within connector housing 310 and accessible through mating end 311. Although the detail is not shown in FIGS. 6 and 7, at least one optical fiber from each optical cable 320 is received by a groove on a corresponding optical ferrule from the plurality of optical ferrules 330, similar to how groove 23 receives optical fiber 40 as depicted in FIG. 2.

Housing 310 includes a bottom wall 313 extending between mating end 311 and optical fiber end 312 and defining a cutout window 314 therethrough at the mating end 311. Note, optical connector 300 is depicted with bottom wall 313 facing up in FIGS. 6 and 7. Each optical ferrule 330 has a major bottom surface 322 and a major top surface 321, comparable to major bottom surface 22 and major top surface 21 of the optical ferrule 20 of FIG. 2. Each major bottom surface 322 of each optical ferrule 330 faces the bottom wall 313 of housing 310, such that redirected light exiting the major bottom surface 322 of at least one of optical ferrules 330 exits the connector housing 310 via cutout window 314 after being turned (redirected) by the light redirecting surfaces in the optical ferrules 330, when no mating connector is attached to optical connector 300.

Figure 8:
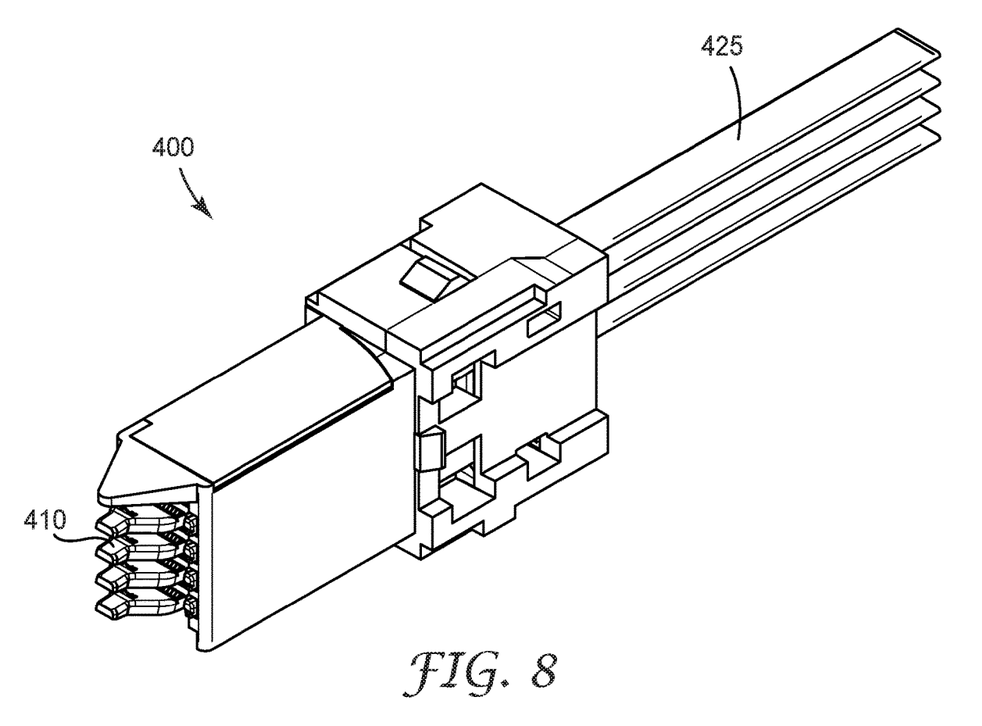
FIG. 8 is a perspective view of a mating optical connector with multiple mating optical ferrules, in accordance with an embodiment of the present description.

FIG. 8 is a perspective view of a mating optical connector 400 with multiple mating optical ferrules 410. Mating optical connector 400 receives one or more optical cables 420, which are attached to mating optical ferrules 410 as previously described herein. When properly mated with the optical connector 300 of FIGS. 6 and 7, each of mating optical ferrules 410 will be disposed adjacent to a corresponding optical ferrule 330 of FIG. 6, such that the redirected light exiting any of optical ferrules 330 is prevented from exiting the housing 310 through cutout window 314. That is, each of mating optical ferrules 410 will be disposed on and adjacent to a corresponding optical ferrule 330 in the same way that mating optical ferrule 220 is disposed on optical ferrule 20 as shown in FIG. 5.

Figure 9:
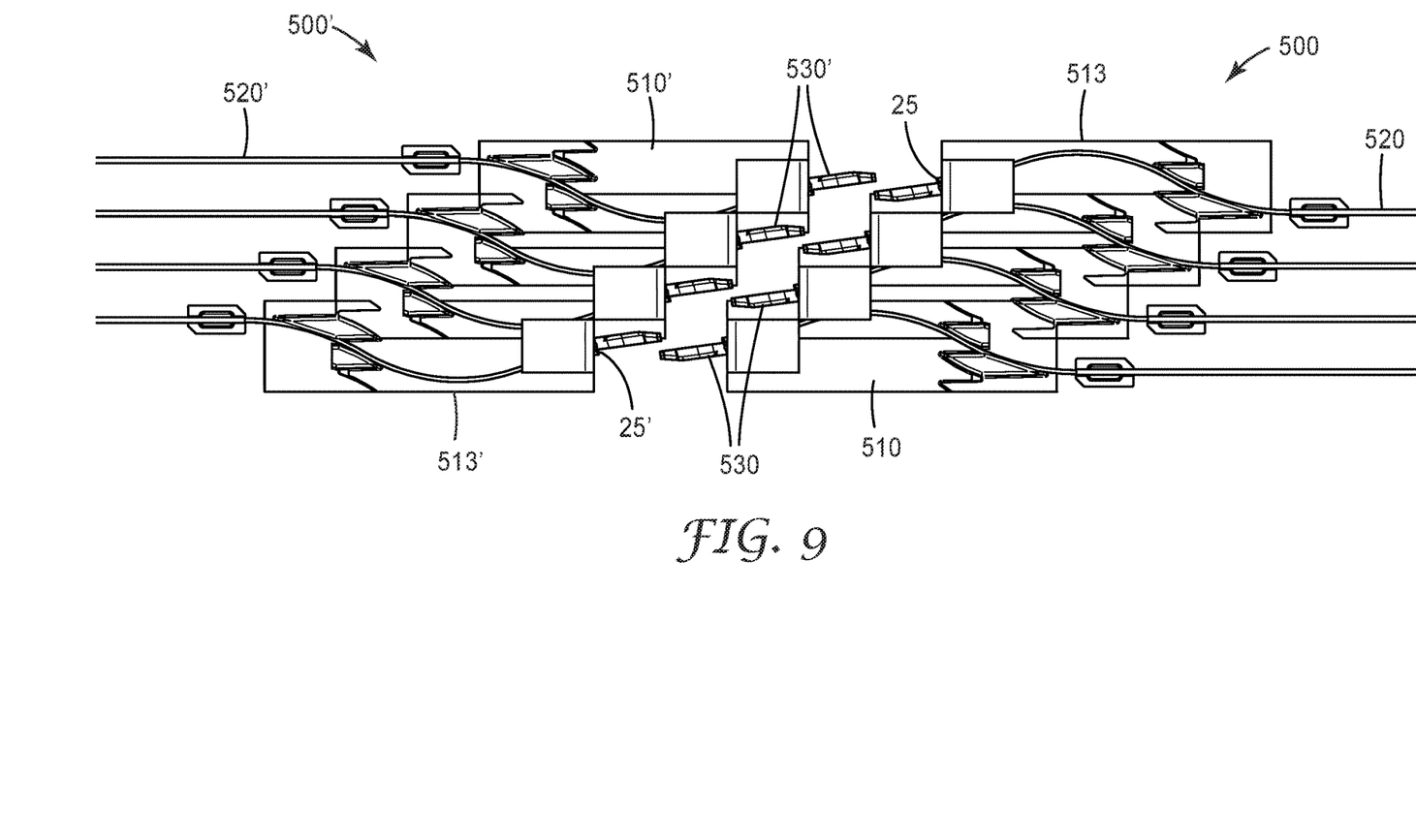
FIG. 9 is a side view of an optical assembly with mating optical connectors, in accordance with an embodiment of the present description.

It is worthy to note that, while the embodiments shown in FIGS. 6-8 show a high density of optical ferrules in optical connectors, a strictly aligned, vertical stacking configuration means that the light exiting a bottom major surface of most of the optical ferrules 330 may be at least partially blocked by an adjacent optical ferrule 330, such that only light exiting the optical ferrule 330 closest to cutout window 314 may directly exit cutout window 314. To compensate for this, some embodiments may utilize optical connectors with staggered optical ferrules, as shown in FIG. 9. FIG. 9 provides a side view of an optical assembly with mating optical connectors offering staggered optical ferrules.

Two opposing mating optical connectors, 500 and 500', are shown in FIG. 9. In some embodiments, connectors 500 and 500' may be of an identical design, while in other embodiments, the connectors may each have a different but complimentary design. In the discussion that follows, the description of each element of connector 500 will apply to the corresponding element (same reference number, such as 500 and 500') of connector 500'. When mated, connectors 500 and 500' are oriented relative to one another such that bottom wall 513 of connector 500 is facing in a direction opposite that of the bottom wall 513' of connector 500'.

In some embodiments, a plurality of optical cables 520 enter one end of connector housing 510 in connector 500. The optical cables 520 are each connected to one of a plurality of optical ferrules 530. Optical ferrules 530 are disposed in connector housing 510 such that the exit locations 25 of each pair of adjacent optical ferrules 530 are offset relative to each other along a first direction Z and a second direction X, such that redirected light leaving the exit location 25 of each optical ferrule 530 may exit the connector housing 310 without being blocked by an adjacent optical ferrule 530.

Terms such as "about" will be understood in the context in which they are used and described in the present description by one of ordinary skill in the art. If the use of "about" as applied to quantities expressing feature sizes, amounts, and physical properties is not otherwise clear to one of ordinary skill in the art in the context in which it is used and described in the present description, "about" will be understood to mean within 10 percent of the specified value. A quantity given as about a specified value can be precisely the specified value. For example, if it is not otherwise clear to one of ordinary skill in the art in the context in which it is used and described in the present description, a quantity having a value of about 1, means that the quantity has a value between 0.9 and 1.1, and that the value could be 1.

Terms such as "substantially" will be understood in the context in which they are used and described in the present description by one of ordinary skill in the art. If the use of "substantially equal" is not otherwise clear to one of ordinary skill in the art in the context in which it is used and described in the present description, "substantially equal" will mean about equal where about is as described above. If the use of "substantially parallel" is not otherwise clear to one of ordinary skill in the art in the context in which it is used and described in the present description, "substantially parallel" will mean within 30 degrees of parallel. Directions or surfaces described as substantially parallel to one another may, in some embodiments, be within 20 degrees, or within 10 degrees of parallel, or may be parallel or nominally parallel. If the use of "substantially aligned" is not otherwise clear to one of ordinary skill in the art in the context in which it is used and described in the present description, "substantially aligned" will mean aligned to within 20% of a width of the objects being aligned. Objects described as substantially aligned may, in some embodiments, be aligned to within 10% or to within 5% of a width of the objects being aligned.

All references, patents, and patent applications referenced in the foregoing are hereby incorporated herein by reference in their entirety in a consistent manner. In the event of inconsistencies or contradictions between portions of the incorporated references and this application, the information in the preceding description shall control.

Descriptions for elements in figures should be understood to apply equally to corresponding elements in other figures, unless indicated otherwise. Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof.

What is claimed is:

1. An optical connector, comprising:
a housing comprising a bottom wall comprising a window therein; and
an optical ferrule disposed in the housing and comprising opposing major top and bottom surfaces, the major bottom surface facing the bottom wall of the housing, the major top surface comprising a groove and a light redirecting surface, the light redirecting surface configured to receive light along a first direction from an optical fiber received and secured in the groove and redirect the received light along a different second direction, the redirected light exiting the optical ferrule though the bottom surface and exiting the housing through the window, such that when the optical connector mates with a mating optical connector comprising a mating optical ferrule, the mating optical ferrule prevents any of the light exiting the optical ferrule from exiting the housing of the optical connector.

2. The optical connector of claim 1, wherein the bottom wall is substantially opaque in a first wavelength range from about 800 nm to about 950 nm, and the window is substantially transparent in the first wavelength range.

3. The optical connector of claim 1, wherein the bottom wall is substantially opaque in a first wavelength range from about 1250 nm to about 1350 nm, and the window is substantially transparent in the first wavelength range.

4. The optical connector of claim 1, wherein the bottom wall is substantially opaque in a first wavelength range from about 1250 nm to about 1700 nm, and the window is substantially transparent in the first wavelength range.

5. The optical connector of any of claim 2, 3, or 4, wherein an average optical transmission of the bottom wall in the first wavelength range is less than about 1%, and an average optical transmission of the window in the first wavelength range is greater than about 70%.

6. The optical connector of claim 1, wherein the window is a through opening defined by the bottom wall.

7. The optical connector of claim 1, wherein the bottom wall is substantially transparent.

8. The optical connector of claim 7, wherein a portion of the bottom wall itself is the window.

9. The optical connector of claim 1, wherein the housing further comprises a top wall opposite the bottom wall, the top wall facing the major top surface of the optical ferrule.

10. The optical connector of claim 9, wherein the top wall does not comprise a window therein.

11. The optical connector of claim 1, wherein the housing further comprises a sliding cover which covers the window in a first position and uncovers the window in a second position.

12. An optical connector assembly, comprising:
the optical connector of claim 1; and
an optical fiber received and secured in the groove, such that the light redirecting surface is configured to receive light from the optical fiber along the first direction and redirect the received light along the second direction, the redirected light exiting the optical ferrule though the bottom surface and exiting the housing through the window.

13. An optical connector, comprising:
a housing comprising a mating end for mating with a mating optical connector, an opposite optical fiber end for receiving an optical cable therethrough, and a bottom wall extending between the mating and fiber ends and defining a cutout window therethrough at the mating end; and a plurality of generally stacked optical ferrules disposed in the housing, each optical ferrule comprising opposing major top and bottom surfaces, the major bottom surface facing the bottom wall of the housing, the major top surface comprising a groove and a light redirecting surface, the light redirecting surface configured to receive light along a first direction from an optical fiber received and secured in the groove and redirect the received light along a different second direction, the redirected light exiting the optical ferrule though the bottom surface and exiting the housing through the cutout window, such that when the optical connector mates with a mating optical connector comprising a plurality of mating optical ferrules, each mating optical ferrule prevents any of the light exiting the corresponding optical ferrule from exiting the housing of the optical connector through the cutout window.

14. The optical connector of claim 13, wherein the light redirecting surface of each optical ferrule is configured to receive light along a first direction from an optical fiber received and secured in the groove and redirect the received light along a different second direction, the redirected light exiting the optical ferrule at an exit location of the bottom surface of the optical ferrule, wherein for each pair of adjacent optical ferrules, the exit locations of the optical ferrules are offset relative to each other along the first and second directions.

* * * * *